(12) United States Patent
Chan et al.

(10) Patent No.: US 6,262,812 B1
(45) Date of Patent: *Jul. 17, 2001

(54) METHOD AND APPARATUS FOR OBJECT-ORIENTED ADJUSTMENT OF COLOR ATTRIBUTES IN A PERCEPTUALLY UNIFORM MANNER

(75) Inventors: Tse-Kee Chan, Penfield; Stephen F. Linder, Fairport; Marty S. Maltz; Fritz F. Ebner, both of Rochester; Scott A. Bennett, Webster; David Birnbaum, Pittsford, all of NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,735

(22) Filed: Apr. 30, 1998

(51) Int. Cl.$^7$ .............................. G06F 15/00; G03F 3/08
(52) U.S. Cl. ............................................. 358/1.9; 358/523
(58) Field of Search ................................. 358/518, 523, 358/524, 520, 537, 539, 540, 515, 504, 501, 1.1, 1.9, 1.16; 382/162, 165, 166, 167, 163

(56) References Cited

U.S. PATENT DOCUMENTS

| 4,839,721 | * | 6/1989 | Abdulwahab et al. | 358/80 |
| 4,972,257 | | 11/1990 | Birnbaum et al. | 358/520 |
| 5,176,147 | * | 1/1993 | Bodis-Wollner | 128/745 |
| 5,315,380 | * | 5/1994 | Ingraham et al. | 358/500 |
| 5,317,418 | | 5/1994 | Lin | 358/456 |
| 5,353,388 | | 10/1994 | Motoyama | 395/117 |
| 5,416,890 | * | 5/1995 | Beretta | 395/131 |
| 5,432,893 | * | 7/1995 | Blasubramanian et al. | 395/131 |
| 5,463,480 | * | 10/1995 | MacDonald et al. | 358/518 |
| 5,469,515 | | 11/1995 | Lin | 382/237 |
| 5,579,031 | * | 11/1996 | Liang | 345/154 |
| 5,579,446 | | 11/1996 | Naik et al. | 395/109 |
| 5,689,349 | * | 11/1997 | Plettinck et al. | 382/162 |
| 5,748,329 | * | 5/1998 | Chang | 358/518 |
| 5,786,908 | * | 7/1998 | Liang | 358/518 |
| 5,933,252 | * | 8/1999 | Emori et al. | 358/500 |
| 5,953,499 | * | 9/1999 | Narendranath et al. | 395/109 |

OTHER PUBLICATIONS

HP's DeskJet 560C Makes Snappy Color Printing Simple, Observer, Mar. 1994, pp. 10–12, and 35–36.*

* cited by examiner

*Primary Examiner*—Madeleine Nguyen
(74) *Attorney, Agent, or Firm*—Oliff & Berridge, PLC (57) ABSTRACT

Image values are adjusted based on image object or component type and in a perceptually linear manner based on user set control values. Image values are also scaled based on dynamic ranges of an input and output device, such as a monitor and a printer. A lookup table is generated for converting image values from an adjustment color space to a printer color space by measuring a test print, inverting the measured data to an adjustment color space and generating a final lookup table based on the adjustment color space data and the inversion color space data. Image values are adjusted in a perceptually linear manner by converting the image values to a perceptually uniform color space and adjusting the values in the adjustment color space before converting the values to a printer device space.

23 Claims, 7 Drawing Sheets

METHOD AND APPARATUS FOR OBJECT-ORIENTED ADJUSTMENT OF COLOR ATTRIBUTES IN A PERCEPTUALLY UNIFORM MANNER

BACKGROUND OF THE INVENTION

1 Field of Invention

This invention generally relates to object-oriented color image value adjustment in a perceptually uniform manner.

2. Description of Related Art

Systems exist that allow a user to create, modify, and print color images. These printing systems typically consist of a general purpose computer, a monitor or other viewing device, and a printer.

Some printing systems allow a user to make contrast and other color adjustments to a printed image. However, these adjustments are typically performed in the monitor's color space or in the printer's color space. Therefore, the resulting changes in the printed image are perceived as highly non-linear and unpredictable when compared to the user-input adjustments. This is because the color spaces that are used to make the adjustments are not visually uniform. That is, the adjustments defined by the user are not carried out by the system in a perceptually uniform manner, as perceived by the human eye.

SUMMARY OF THE INVENTION

Accordingly, this invention provides an image adjusting device and method that performs image adjustment in a perceptually linear manner. For example, image value adjustment is made in a perceptually uniform color space to achieve perceptually linear image adjustment based on user-input control values.

An aspect of the invention provides the ability to define and apply different user-set image object or component adjustment values for different image types, e.g., text, graphics, bitmap, etc.

An aspect of the invention provides adjustment of image values based on user-set image adjustment values and a projection of at least one color balance vector on one of the adjustment color space channels.

An aspect of the invention also provides contrast adjustment of image values based on a sigmoidal function that is influenced by a user-set image adjustment value.

An aspect of the invention also provides scaling of image values based on an input device's color gamut, such as a monitor's or scanner's color gamut, and an output device's color gamut, such as a printer's color gamut, to maximize the dynamic range of image values output from the image adjustment system.

An aspect of the invention also provides a method for generating a look-up table for converting values in an adjustment color space to a printer device color space. To create the lookup table, a test print is generated by a printer using known input values. Measurement data is generated from the test print, and the measured data is inverted in an inversion color space to generate a first lookup table. The first lookup table converts image values from the inversion color space to the printer device space. The measured data is also converted to an adjustment color space. The measured data is not inverted in the adjustment color space to generate the first lookup table because to do so might cause undesirable gamut warping effects that degrade the quality of the color rendering processes. Values in the adjustment color space are scaled to maximize the dynamic range of the values in the adjustment color space. Samples of the scaled values are then converted to the inversion color space, and using the first lookup table, printer color space values corresponding to the scaled values in the adjustment color space are determined. A final lookup table is created by concatenating the determined printer color space values and the scaled values in the adjustment color space. The final lookup table converts values from the adjustment color space to the printer color space.

BRIEF DESCRIPTION OF THE DRAWINGS

The invention will be described in relation to the following drawings, in which reference numerals refer to like elements, and wherein.

DETAILED DESCRIPTION OF PREFERRED EMBODIMENTS

Figure 1:
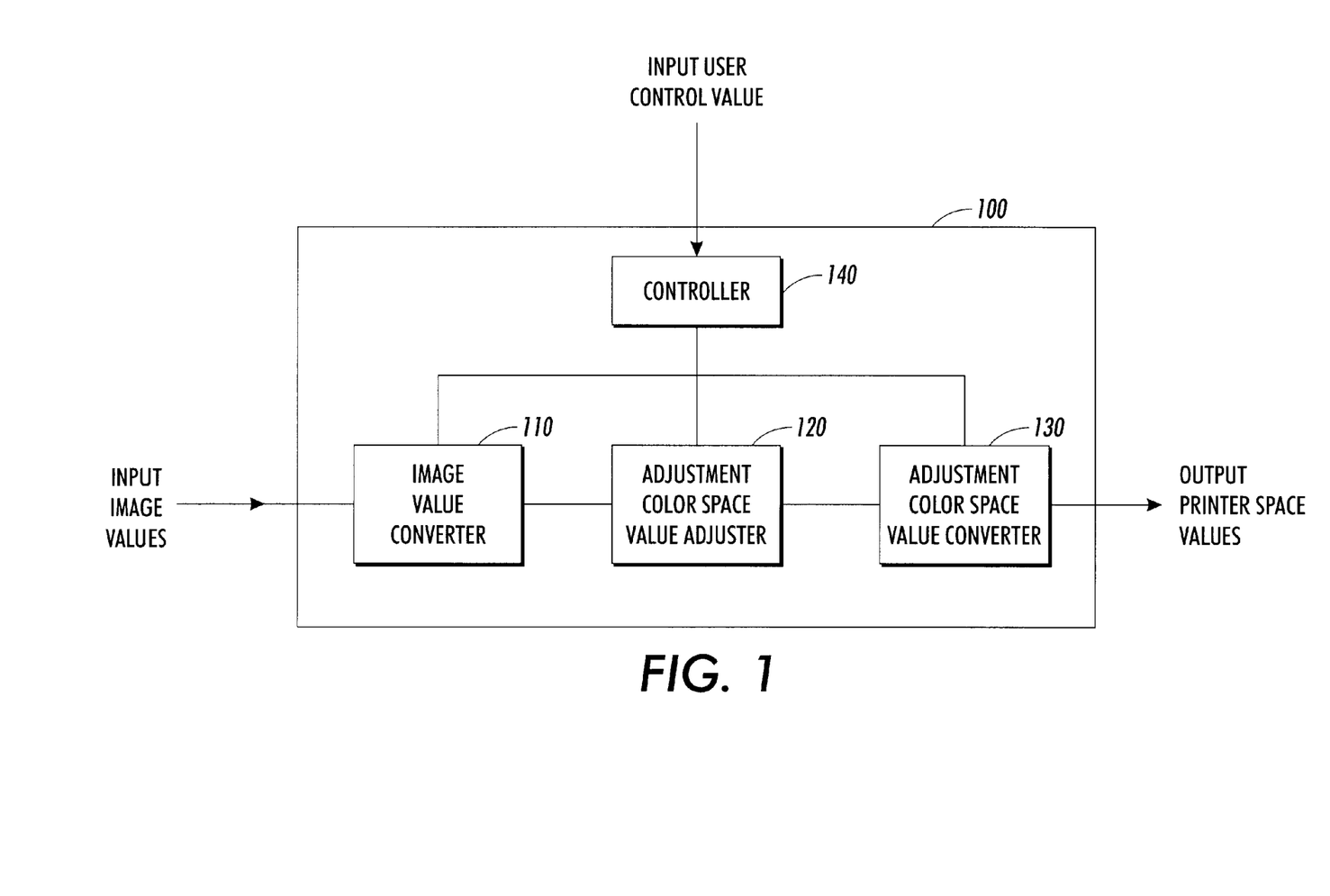
FIG. 1 is a functional block diagram of a device for adjusting input values in accordance with the invention.

FIG. 1 shows a general purpose computer 100 that is programmed to adjust input image values in accordance with the invention. However, the invention is not limited to a programmed general purpose computer. As will be understood by one of skill in the art, the invention could be implemented as a single special purpose integrated circuit (e.g., ASIC) or an array of ASICs, each having a main or central processor section for overall, system-level control, and separate sections dedicated to performing various different specific computations, functions and other processes under the control of the central processor section. The invention can also be implemented using a plurality of separate dedicated or programmable integrated or other electronic circuits or devices, e.g., hardwired electronic or logic circuits such as discrete element circuits or programmable logic devices (including PLDs, PLAs, PALs or the like). In general, any device or assembly of devices capable of implementing the flowcharts shown in FIGS. 2–4 can be used. The general purpose computer 100 can be a stand alone system that communicates with a printer and other image processing apparatus, or included as an internal part of a printer or other device.

Image values that are to be adjusted are input to an image value converter 110 in the general purpose computer 100. Under the control of a controller 140, the image value converter 110 converts the input image values to an adjustment color space and outputs the converted values to an adjustment color space value adjuster 120. Preferably, the adjustment color space is a perceptually uniform color space. The adjustment color space value adjuster 120 adjusts the converted image values in accordance with user control values input by a user into the controller 140. The adjustment color space value adjuster 120 can make other adjustments to the values, including scaling. Preferably, the converted values are scaled based on an input device's color gamut, such as a monitor or printer color gamut, and an output device's color gamut, such as a printer gamut. The adjusted image values are output to an adjustment color space value converter 130 that converts the adjusted and scaled image values to printer space values.

Preferably, the adjustment color space value adjuster 120 adjusts the image values in accordance with an image object or component type corresponding to the image values. For example, images frequently contain different types of image objects or components, including bitmap, text and graphic components. While a given type of image object or component adjustment may enhance one type of image, object or component the same image adjustment may create unwanted artifacts in another type of image object or component. Therefore, it is often preferable to perform different types of adjustment on different types of image objects or components. However, identical adjustment of image values regardless of the corresponding image object or component type can also be performed. Identification of the different image types that correspond to different image object or component portions can be done by the user or automatically by the system without the user's input, as will be appreciated by one of skill in the art.

Figure 2:
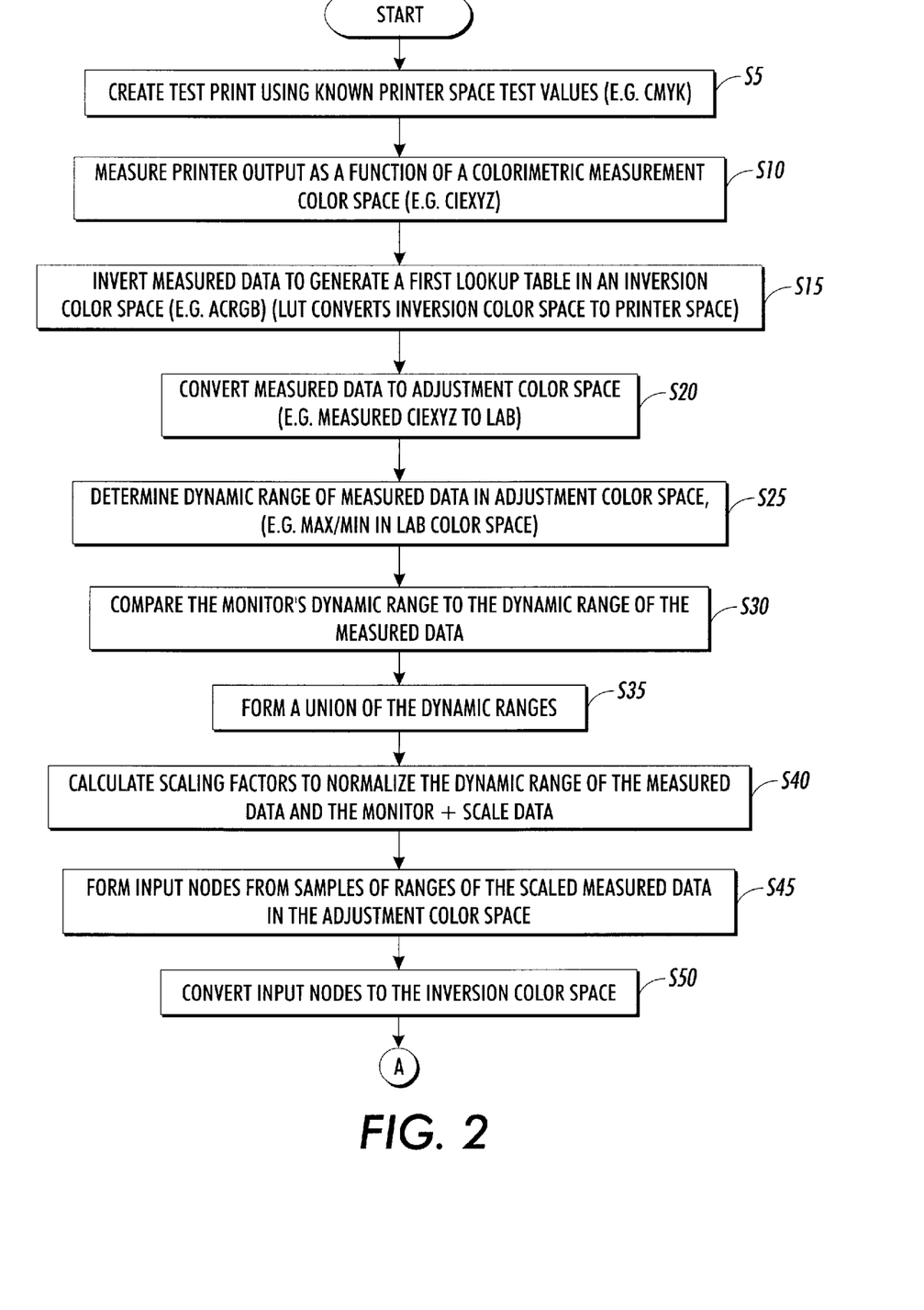
FIGS. 2 and 3 are a flowchart for generating a lookup table to convert values from an adjustment color space to a printer device space.
Figure 3:
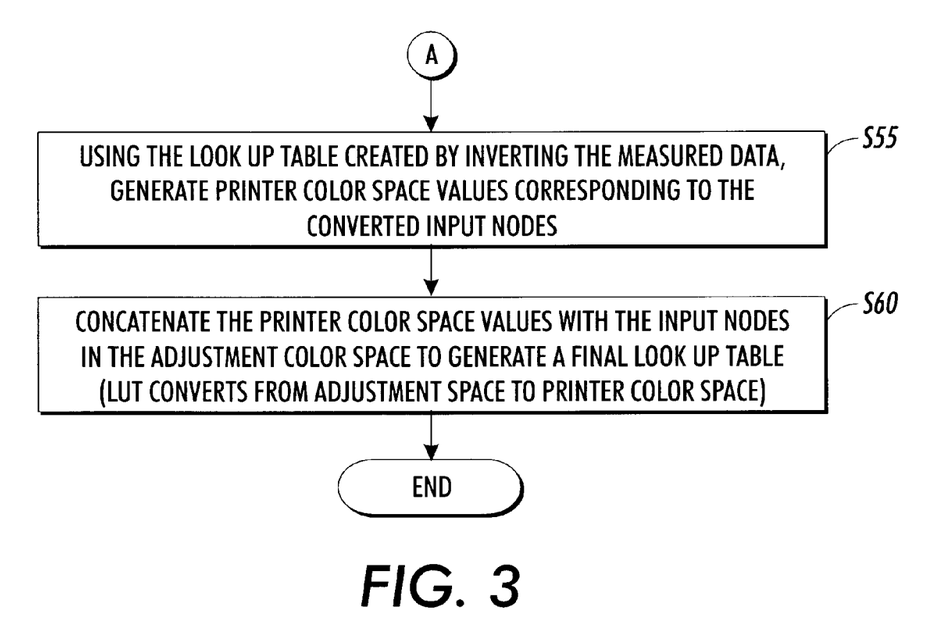

The adjustment color space value converter 130 is equipped with an appropriate lookup table or other means, e.g., hard-wired circuitry, or other processing capabilities, to convert image values from the adjustment color space to the printer device space. FIGS. 2 and 3 show a flowchart outlining a preferred process for determining a lookup table for use by the adjustment color space value converter 130. In the following description, a data processing system (not shown), comprising a programmed computer, printer, monitor, spectrophotometer, etc., that is separate from the general purpose computer 100 is used to perform the process outlined in FIGS. 2 and 3, and the resulting lookup table is stored for access by the adjustment color space value converter 130. However, the general purpose computer 100 could be programmed to generate the lookup table for use by the adjustment color space value converter 130.

In step S5 of FIG. 2, generation of the lookup table for the adjustment color space value converter 130 is begun by creating a test print using known printer space input values. For example, a set of CMYK values representing a desired test pattern are input to a printer which generates a test print. In step S10, the printer output is measured as a function of a measurement color space, e.g., measurement data in a colorimetric color space, such as the CIEXYZ color space, are generated. The measurement data are generated, for example, by a spectrophotometer and supplied to the data processing system.

In step S15, the data processing system inverts the measured data in an inversion color space to generate a first lookup table. For example, the CIEXYZ measured data is inverted to generate a first lookup table that converts from a gamma-corrected RGB color space to the printer device space, i.e., CMYK. The measured data is inverted in an inversion space, such as the gamma-corrected RGB color space, to avoid creating gamut warping effects that degrade color rendering if the measured data is inverted in the adjustment color space, such as the CIELab space.

In step S20, the data processing system also converts the measured data to an adjustment color space. For example, the CIEXYZ measured data is converted to the CIELab color space.

In step S25, the dynamic range of the measured data in the adjustment color space is determined, e.g., the minimum and maximum values of the measured data in the Lab color space are determined. In step S30, the dynamic range of the measured data is compared to a dynamic range of a monitor that is used with the image adjustment system. Preferably, the dynamic range of the specific monitor that is used with the image adjustment system is used. However, the dynamic range of an average or representative monitor can be used. In step S35, a union of the dynamic ranges of the monitor and the measured data is formed. In step S40, scaling factors are calculated to normalize the dynamic range of the measured data and the monitor, and the scaling factors are used to scale the measured data.

For example, a scaling factor and an offset for each of the L, a, and b channels are generated by the data processing system. In a preferred embodiment of an invention, the dynamic range offset (DRO) for each of L, a, and b is determined as shown in Equations 1–3:

$$DRO_L = \text{MIN}(MG_L, PG_L) \times 1.05 \quad (1)$$

$$DRO_a = \text{MIN}(MG_a, PG_a) \times 1.05 \quad (2)$$

$$DRO_b = \text{MIN}(MG_b, PG_b) \times 1.05 \quad (3)$$

where $DRO_L$ is the dynamic range offset for the L channel, $MG_L$ is the monitor gamut for the L channel, and $PG_L$ is the printer gamut in the L channel. The DRO for the a and b channels are similarly determined as shown in Equations 2 and 3, where the subscript of each of the variables denotes the corresponding color space channel. Of course, a color gamut for an input device other than the monitor, such as a scanner, can be used.

The dynamic range scaling factor (DRSF) for each of the L, a and b channels is determined as shown in Equations 4–6:

$$DRSF_L = \frac{\text{MAX}(MG_L, PG_L) - \text{MIN}(MG_L, PG_L)}{255} \quad (4)$$

$$DRSF_a = \frac{\text{MAX}(MG_a, PG_a) - \text{MIN}(MG_a, PG_a)}{255} \quad (5)$$

$$DRSF_b = \frac{\text{MAX}(MG_b, PG_b) - \text{MIN}(MG_b, PG_b)}{255} \quad (6)$$

where $DRSF_x$ is the dynamic range scaling factor, $MG_x$ is the monitor gamut for each of the channels, and $PG_x$ is the printer gamut for each of the channels. The values shown in Equations 4–6 are divided by 255 because in this example, the image values in the Lab color space are 8-bit values. Of course, other bit values can be used and the value of 255 in Equations 4–6 would have to be changed accordingly. For example, in the case where 4-bit image values are used, the value of 255 would be changed to 15.

In step S45, input nodes from samples of ranges of the scaled measured data in the adjustment color space are formed. For example, 15 samples of the Lab measured data are taken at steps of 17 over the dynamic range of the data, e.g., 0–255. In step S50, the input nodes are converted to the inversion color space. For example, the input nodes in the Lab color space are converted to the gamma-corrected RGB color space.

In step S55, using the first lookup table created in step S15, printer device space values that correspond to the converted input nodes are generated. For example, the first lookup table is used to determine the printer space CMYK values that correspond to the gamma-corrected RGB input nodes.

In step S60, the printer device space values are concatenated with the input nodes in the adjustment color space to generate a final lookup table that converts from the adjustment color space to the printer color space. For example, a final lookup table is generated from the printer space CMYK values determined in step S55 and the corresponding Lab color space values from step S45. The final lookup table is then stored for access by the adjustment color space value converter 130. Once the adjustment color space value converter 130 has access to the final lookup table, the image adjustment system is capable of adjusting input image values.

Figure 4:
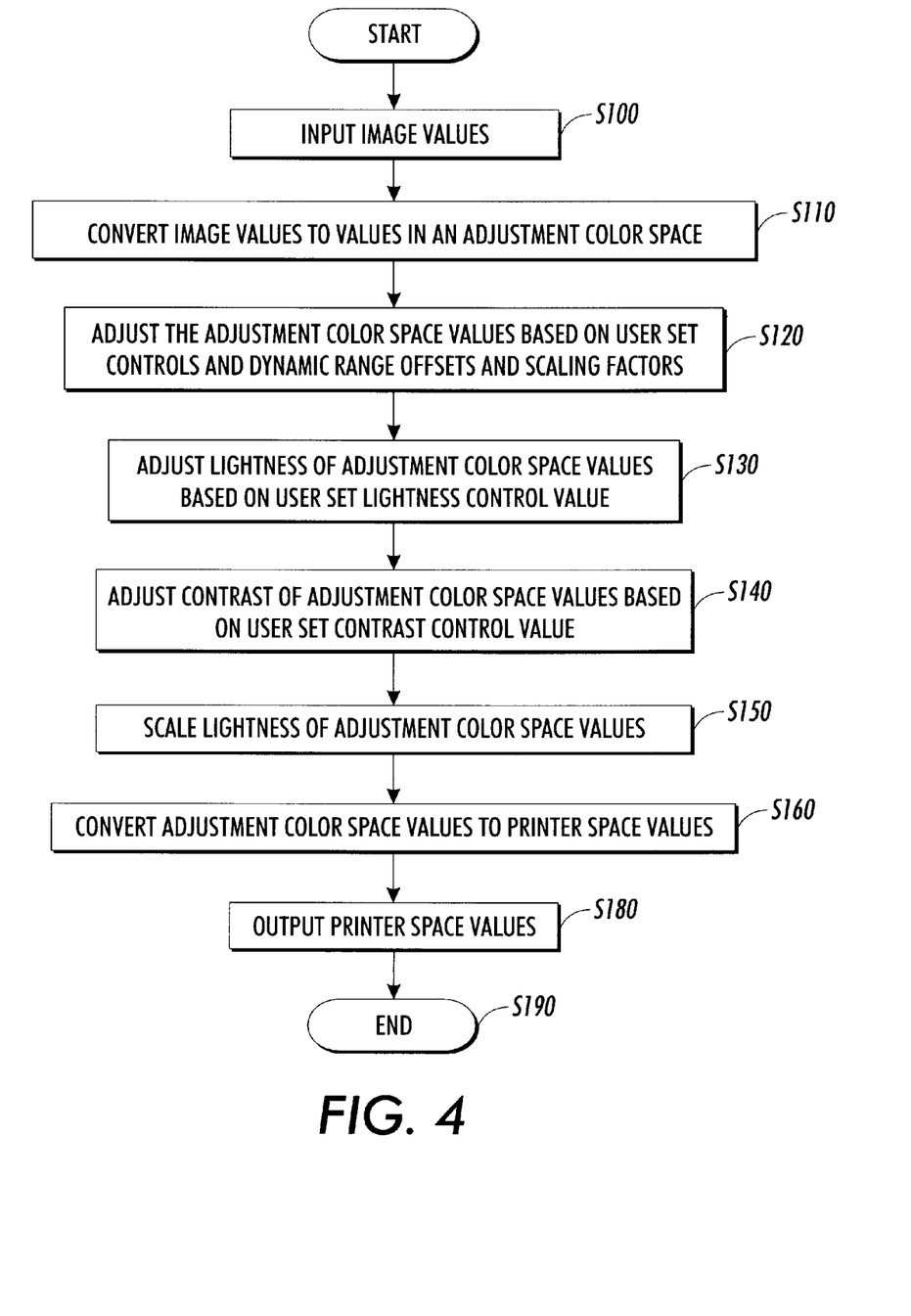
FIG. 4 is a flowchart of a process for adjusting input image values performed by the system of the invention.

FIG. 4 shows a flowchart outlining a process for adjusting image values in accordance with the invention. To simplify the following description, the user-set image adjustment values are applied to all image object or component types not on an object-oriented basis. However, as will be appreciated by one of skill in the art, the user-set image adjustment values can be defined and separately applied for each image object or component type.

In step S100, image values are input into the image value converter 110. In step S110, the image value converter 110 converts the image values into values in an adjustment color space. For example, the image value converter 110 converts image values input in the CIEXYZ color space to values in the CIELab color space, which is a perceptually uniform color space. Other perceptually uniform color spaces can be used, such as CIELuv and CIELch. A perceptually uniform color space is used so that user adjustments to an image can be made in a perceptually uniform manner.

Figure 5:
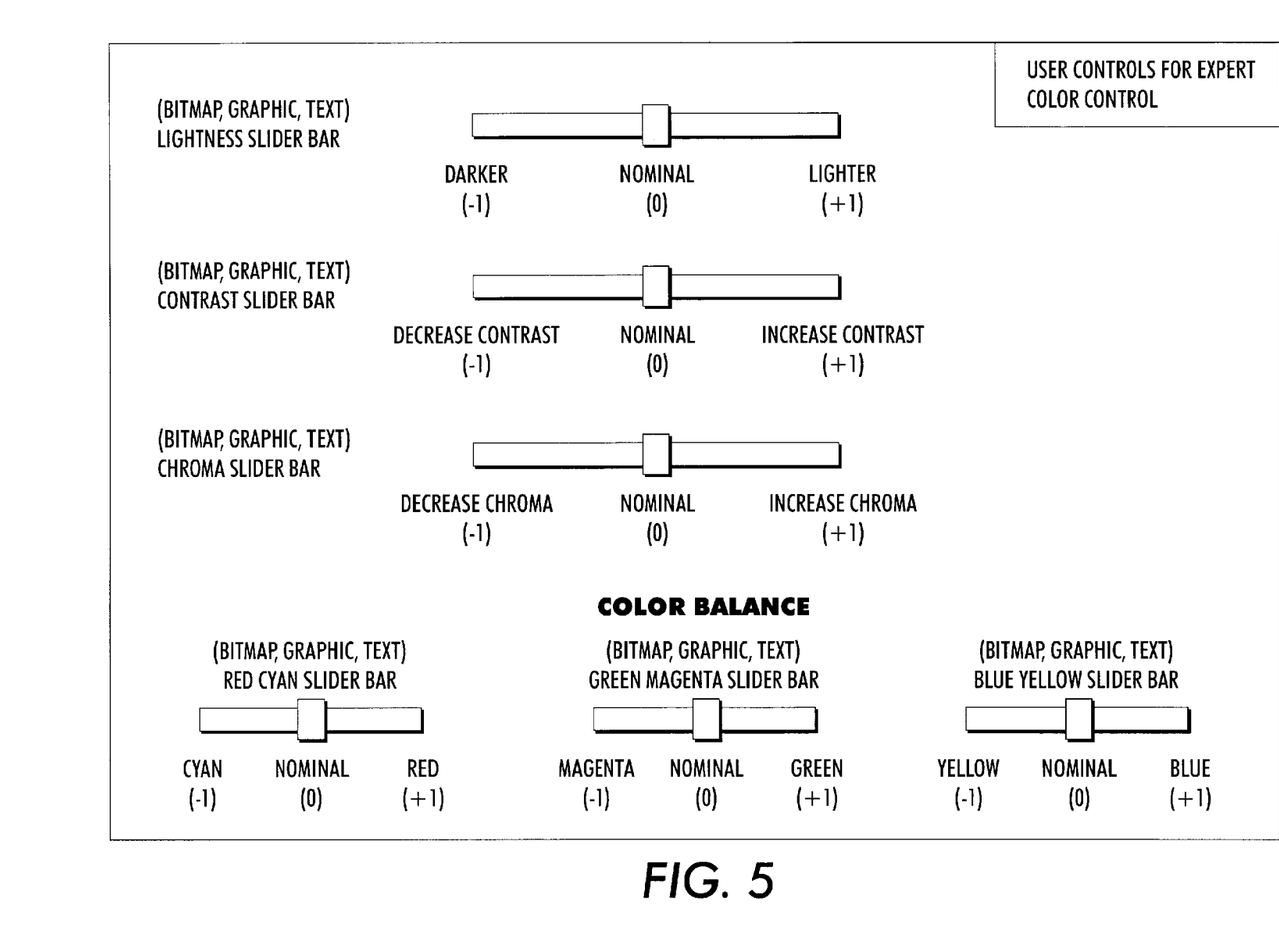
FIG. 5 is an example graphical user interface for inputting user control values.

In step S120, the adjustment color space value adjuster 120 adjusts the adjustment color space values based on user set control values and the dynamic range offsets and dynamic range scaling factors. For example, the adjustment color space value adjuster 120 determines new color values $a_{NEW}$ and $b_{NEW}$ as shown in Equations 7 and 8:

$$a_{NEW} = \frac{(a_{IN} \times F_{CA} + OFF_{CBa}) - DRO_a}{DRSF_a} - 128 \quad (7)$$

$$b_{NEW} = \frac{(b_{IN} \times F_{CA} + OFF_{CBb}) - DRO_b}{DRSF_b} - 128 \quad (8)$$

where $a_{NEW}$ and $b_{NEW}$ are the adjusted color values, $a_{IN}$ and $b_{IN}$ are the input adjustment color space values, $F_{CA}$ is a user-defined chroma adjustment factor, and $OFF_{CBa}$ and $OFF_{CBb}$ are color balance offsets for the a and b channels. The chroma adjustment factor $F_{CA}$ is determined as shown in Equation 9:

$$F_{CA} = 1 + U_{CH} \times SF_C \quad (9)$$

where $U_{CH}$ is a user-defined chroma adjust value and $SF_C$ is a chroma scale factor. $U_{CH}$ can be defined by a user using the graphical user interface shown in FIG. 5. To adjust the user-defined control values, including $U_{CH}$, the user adjusts the slide bar icon to achieve the desired image adjustment. $SF_C$ is not a user-defined value. Instead, $SF_C$ is determined empirically by the system designers and is prestored in the system. $SF_C$, like all of the other scale factors, is set so that the adjustment color space values are adjusted in a desired manner, e.g., a perceptually uniform manner, for a given range of user adjust values.

$OFF_{CBa}$ and $OFF_{CBb}$ are determined as shown in Equations 10 and 11:

$$OFF_{CBa} = \sum^{ALLCOLORS} U_{CBCOLOR} \times PROJa_{COLOR} \quad (10)$$

$$OFF_{CBb} = \sum^{ALLCOLORS} U_{CBCOLOR} \times PROJb_{COLOR} \quad (11)$$

where $U_{CBCOLOR}$ is a user-defined color balance value for each color, e.g., red, cyan, green, magenta, blue and yellow, and $PROJa_{color}$ and $PROJb_{color}$ are projections of a color balance vector for each color onto the a and b channels. The color balance vectors are not user-defined. Instead, the color balance vector parameters are set at the system design level to fine tune the color direction and magnitude of the user-set color balance adjustments.

The user-defined value $U_{CBCOLOR}$ can be set by the user using the graphical user interface shown in FIG. 5. However, as with all of the user-defined values, the user can input a control value using a keyboard or other suitable means.

Figure 6:
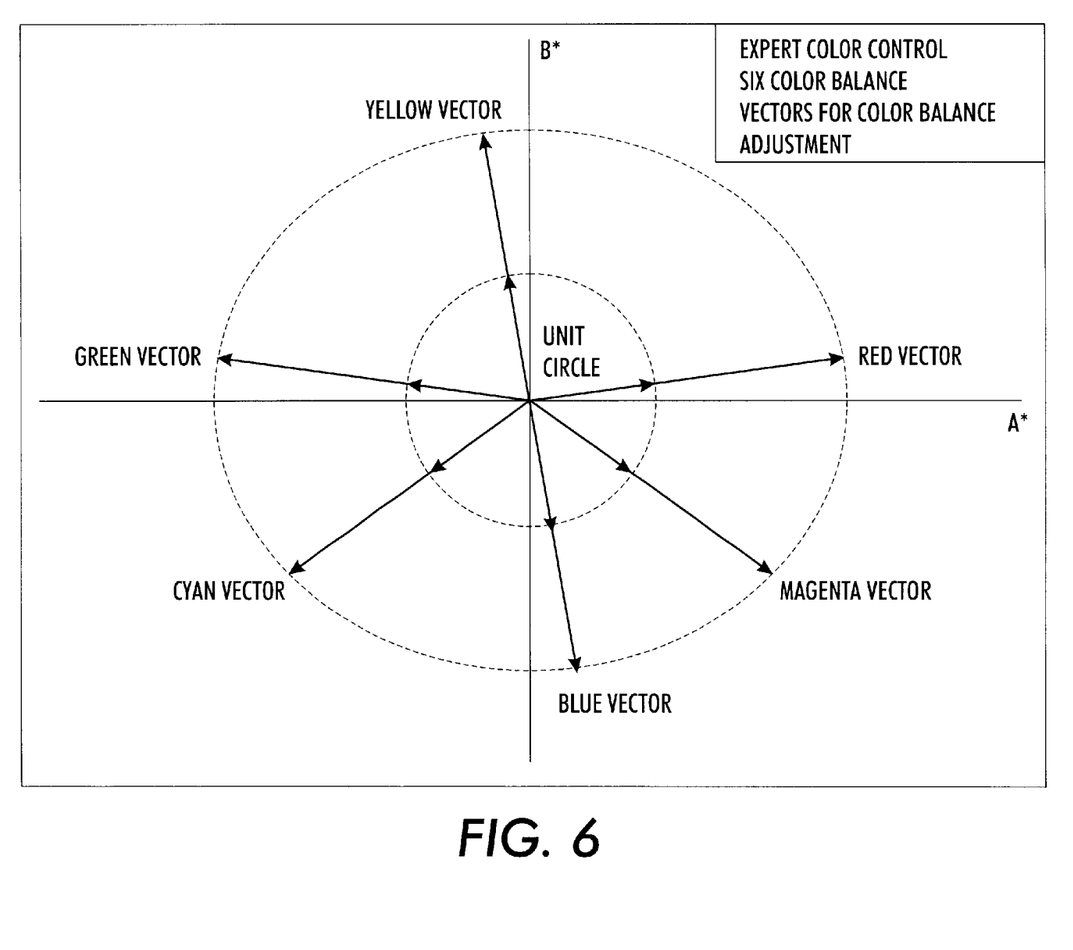
FIG. 6 shows six color balance vectors used in determining color balance adjustments.

$PROJa_{COLOR}$ and $PROJb_{COLOR}$ are determined for each color based on the parameters of a length and angle for each color balance vector. FIG. 6 shows six color balance vectors for each color, i.e., red, yellow, green, cyan, blue and magenta. Each vector has a predefined length and angle, which is measured in a counterclockwise direction starting from the positive portion of the a axis. Therefore, as can be seen in FIG. 6, the projection of each color vector onto the a and b channels is determined as shown in Equations 12 and 13:

$$PROJa_{COLOR} = CBVL_{COLOR} \times \cos(CBVA_{COLOR}) \quad (12)$$

$$PROJb_{COLOR} = CBVL_{COLOR} \times \sin(CBVA_{COLOR}) \quad (13)$$

where $CBVL_{COLOR}$ is the length of the color balance vector for each color, and $CBVA_{COLOR}$ is the angle for the color balance vector for each color. The vector angle and length for each color vector are determined empirically by the system designers so that the adjustment color space values are adjusted in a desired manner, e.g., a perceptually uniform manner, for a given range of user adjust values.

After adjustment of the adjustment color space values in step S120 is complete, the adjustment color space value adjuster 120 adjusts the lightness of the adjustment color space values in step S130 based on a user-set lightness control value. For example, the adjustment color space value adjuster 120 determines an interim luminance value $L_{INT}$ as shown in Equation 14:

$$L_{INT} = L_{IN} + OFF_{LIGHT} \quad (14)$$

where $L_{IN}$ is the input image value in the L channel, and $OFF_{LIGHT}$ is a user-defined lightness offset value. $OFF_{LIGHT}$ can be defined as shown in Equation 15:

$$OFF_{LIGHT} = U_{LIGHT} \times SF_{LIGHT} \quad (15)$$

where $U_{LIGHT}$ is a user-defined lightness control value, and $SF_{LIGHT}$ is a lightness scale factor. $U_{LIGHT}$ is input by a user interacting with the graphical user interface shown in FIG. 5, or by other suitable means. $SF_{LIGHT}$ is determined empirically by the system designers and is prestored in the system.

Figure 7:
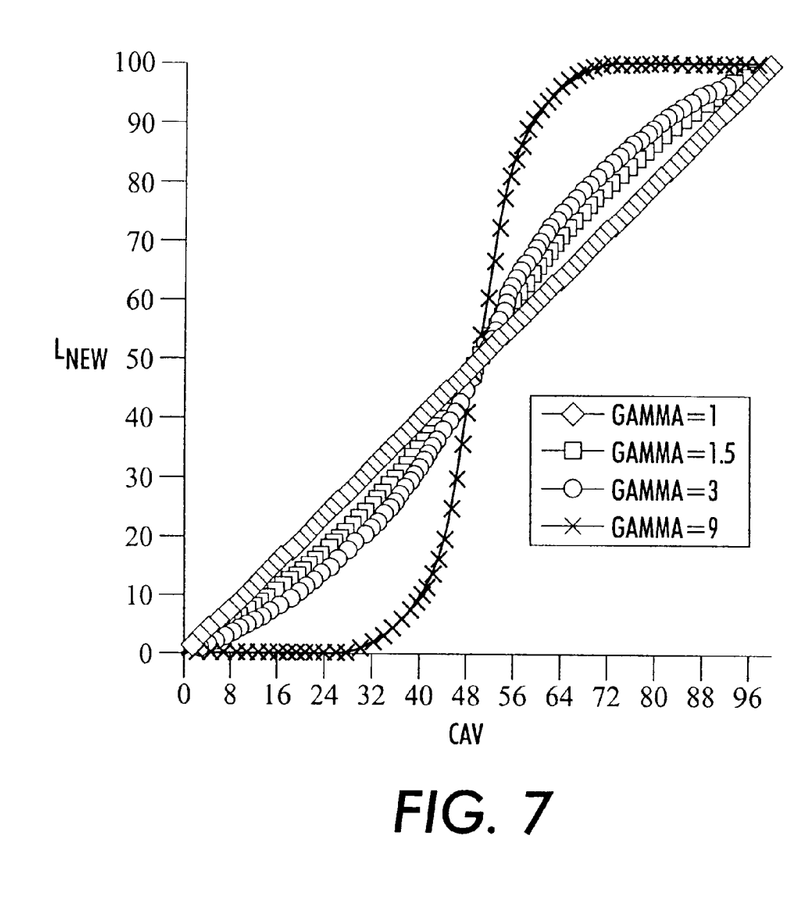
FIG. 7 is a graphical representation of a sigmoidal function for determining a contrast-adjusted lightness value.

In step S140, the adjustment color space value adjuster 120 adjusts the contrast of the adjustment color space values based on a user-set contrast control value. For example, the adjustment color space value adjuster 120 adjusts the contrast based on a sigmoidal function as shown in FIG. 7, where $L_{NEW}$ is a contrast-adjusted lightness value, and CAV is a contrast adjustment value that is determined based on a value y. The shape of the sigmoidal function shown in FIG. 7 is determined by the value of y. For example, the sigmoidal function is represented by a virtually straight line for low values of γ, e.g., near 1, and increases in curvature for higher values of γ. CAV is determined as shown in Equation 16:

$$CAV = 50\left(\frac{Lint^\gamma}{50^\gamma}\right) \quad 50 \geq L_{INT} > 0 \quad (16)$$

$$CAV = 100 - 50\left(\frac{(100-L_{int})^\gamma}{50^\gamma}\right) \quad 100 > L_{INT} > 50$$

where a different equation for determining CAV is used depending on the value of $L_{INT}$. γ is determined as shown in Equation 17:

$$\gamma = 1 + U_{CONT} \times SF_\gamma \quad (17)$$

where $U_{CONT}$ is a user-defined contrast control value and $SF_\gamma$ is a gamma scale factor. $U_{CONT}$ is input using the graphical user interface as shown in FIG. 5, or by other suitable means. $SF_\gamma$ is determined empirically by the system designers and is prestored in the system.

In step S150, the adjustment color space value adjuster 120 scales the lightness of the adjustment color space values. For example, the adjustment color space value adjuster 120 adds the value $DRO_L$ from Equation 1 to the L channel values output in step S140 and multiplies the result by the value $DRSF_L$ from Equation 4 to the sum. However, scaling can be done as part of step S140 by appropriately adjusting the sigmoidal function.

In step S160, the adjustment color space value converter 130 converts the adjusted color space values to printer device space values. For example, the adjustment color space value converter 130 converts the Lab color space values to CMYK color space values using the final lookup table discussed above with respect to FIGS. 2 and 3. In step S180, the adjustment color space value converter 130 outputs the printer space values.

Although the embodiment discussed above uses the dynamic range offset and scale factor values DRO and DRSF to adjust the color space values, and converts the input image values to a perceptually uniform color space to adjust the values, both of these features are not required. For example, the image values need not be converted to a perceptually uniform color space to make adjustments to the image values. Instead, scaling of the image values could be done in a non-perceptually uniform color space. In contrast, the system could convert image values to a perceptually uniform color space and make color, contrast and other adjustments to the values, but not scale the values as discussed above.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention as set forth in the patented claims.

What is claimed is:

1. An image value processing device, that processes an image containing a plurality of image components, each image component having an image component type and at least one image value, the image containing a plurality of different image component types, comprising:
   an image value converter that converts input image values in a first color space into values in a perceptually uniform color space;
   an adjuster that adjusts the perceptually uniform color space values of each one of the plurality of image components in accordance with the image component type of that image component and user-defined control values;
   an adjusted color space value converter that converts the adjusted perceptually uniform color space values to values in a second color space; and
   a controller that controls the operation of the image value converter, the adjuster and the adjusted color space value converter, and that inputs user-defined control values for at least two image component types.

2. The image value processing device of claim 1, further comprising:
   user control value input means that inputs and supplies the user-defined control values to the controller.

3. The image value processing device of claim 2, wherein the user control value input means comprises a graphical user interface, and the user-defined control values are set by adjusting a control icon that is displayed as part of the graphical user interface.

4. The image value processing device of claim 1, wherein the adjuster scales the perceptually uniform color space values based on a output device gamut and an input device gamut.

5. The image value processing device of claim 4, wherein the adjuster scales the perceptually uniform color space values based on an offset and a scale factor that are determined based on a printer output gamut and a monitor input gamut.

6. The image value processing device of claim 1, wherein the adjuster adjusts the perceptually uniform color space values based on a projection of a color balance vector on a perceptually uniform color space channel.

7. The image value processing device of claim 1, wherein the adjuster adjusts a contrast of the perceptually uniform color space values based on a sigmoidal function.

8. The image value processing device of claim 7, wherein the sigmoidal function is modified based on a user-defined control value.

9. The image value processing device of claim 1, wherein a user-defined control value is modified by a stored scale factor.

10. An image value processing device, that processes an image containing a plurality of image components, each image component having an image component type and at least one image value, the image containing a plurality of different image component types, comprising:
    an image value converter that converts input image values of an image component that are in a first color space into values in an intermediate color space;
    an adjuster that adjusts the intermediate color space values of an image component in accordance with the image component type of that image component, user-defined control values, and an output device gamut and an input device gamut; and
    an intermediate color space value converter that converts the intermediate color space values of the image component to printer space values.

11. The image value processing device of claim 10, wherein the intermediate color space is a perceptually uniform color space.

12. The image value processing device of claim 11, wherein the intermediate color space is CIELab.

13. The image value processing device of claim 10, wherein the adjuster adjusts the intermediate color space values based on a dynamic range offset and a dynamic range scaling factor that are determined based on a printer output gamut and a monitor input gamut.

14. The image value processing device of claim 10, wherein the adjuster adjusts the intermediate color space values based on a projection of a color balance vector on an intermediate color space channel.

15. The image value processing device of claim 10, wherein the adjuster adjusts a contrast of the intermediate color space values based on a sigmoidal function.

16. The image value processing device of claim 10, wherein the adjuster adjusts the intermediate color space values in a perceptually uniform manner with respect to the user-defined control values.

17. The image value processing device of claim 16, wherein the image component types include text, bitmap, and graphics.

18. A method for adjusting image values comprising the steps of:

creating a test print using known printer space input values;

generating measured data in a measurement color space from the test print;

inverting the measured data in an inversion color space to generate a first lookup table;

converting the generated measured data to an adjustment color space;

determining a dynamic range of the generated measured data in the adjustment color space;

comparing an input device's dynamic range to the dynamic range of the generated measured data in the adjustment color space;

determining scaling values based on the comparison of the dynamic range of the input device and the dynamic range of the generated measured data;

adjusting the generated measured data in the adjustment color space based on the scaling values; and generating a second lookup table based on the first lookup table and the adjusted generated measured data in the adjustment color space.

19. The method of claim 18, further comprising the steps of:

inputting image values;

converting the image values to values in an adjustment color space;

adjusting the adjustment color space values based on user set control values; and converting the adjustment color space values to output color space values based on the second lookup table.

20. A method of claim 19, further comprising the step of:

adjusting the adjustment color space values based on the scaling values determined based on the dynamic range of the measured data and a dynamic range of a monitor.

21. The method of claim 20, wherein the adjustment color space is a perceptually uniform color space.

22. The method of claim 19, wherein the adjustment color space values are adjusted in a perceptually linear manner with respect to the user set control values.

23. The method of claim 18, wherein the inversion color space is chosen to reduce unwanted effects of inverting the measured data to generate the first lookup table.

* * * * *